(12) United States Patent
Bastide et al.

(10) Patent No.: US 9,910,918 B2
(45) Date of Patent: *Mar. 6, 2018

(54) PRESENTING TAGS OF A TAG CLOUD IN A MORE UNDERSTANDABLE AND VISUALLY APPEALING MANNER

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,373

(22) Filed: Sep. 15, 2014

(65) Prior Publication Data

US 2015/0193550 A1 Jul. 9, 2015

Related U.S. Application Data

(63) Continuation of application No. 14/150,553, filed on Jan. 8, 2014.

(51) Int. Cl.
*G06F 17/00* (2006.01)
*G06F 17/24* (2006.01)
(Continued)

(52) U.S. Cl.
CPC ...... *G06F 17/30719* (2013.01); *G06F 17/218* (2013.01); *G06F 17/271* (2013.01);
(Continued)

(58) Field of Classification Search
CPC .. G06F 17/24; G06F 17/30905; G06F 17/241; G06F 17/30038; G06F 17/30525
See application file for complete search history.

(56) References Cited

U.S. PATENT DOCUMENTS 8,359,191 B2   1/2013   Chen et al.
9,141,694 B2 * 9/2015   Lamere ............. G06F 17/30749
(Continued)

OTHER PUBLICATIONS

Chen et al., "Tagcloud-based explanation with feedback for recommender systems," Jul. 28-Aug. 1, 2013, SIGIR '13 Proceedings of the 36th international ACM SIGIR conference on Research and development in information retrieval, pp. 945-948.*

(Continued)

*Primary Examiner* — Ariel Mercado Vargas
(74) *Attorney, Agent, or Firm* — Robert A. Voigt, Jr.; Winstead, P.C.

(57) ABSTRACT

A method, system and computer program product for presenting tags of a tag cloud in a more understandable and visually appealing manner. Tags of a tag cloud that are associated with an object (e.g., web page) are retrieved. The retrieved tags are then assigned to parts of speech (e.g., noun, verb, adjective, adverb). Combinations of the tags are then generated based on the parts of speech assigned to the tags. For example, the combinations of the tags may be based on a template, such as <NOUN> <VERB> <ADJECTIVE>, <PRONOUN> <VERB> <ADJECTIVE>, <PRONOUN> is <ADVERB><VERB> and so forth. The combinations of the tags are then presented after determining the layout to display the generated combinations of tags. Since the tags of the tag cloud are presented in a combination based on the parts of speech assigned to the tags, the tag cloud is more understandable and visually appealing.

15 Claims, 3 Drawing Sheets

(51) Int. Cl.

| | |
|---|---|
| *G06F 17/30* | (2006.01) |
| *G10L 15/06* | (2013.01) |
| *G06F 17/21* | (2006.01) |
| *G06F 17/27* | (2006.01) |
| *G10L 21/10* | (2013.01) |
| *G10L 15/18* | (2013.01) |
| *G10L 15/26* | (2006.01) |
| *G10L 25/87* | (2013.01) |
| *G10L 25/48* | (2013.01) |

(52) U.S. Cl.
CPC ........ *G06F 17/30876* (2013.01); *G10L 15/06* (2013.01); *G10L 15/18* (2013.01); *G10L 15/26* (2013.01); *G10L 21/10* (2013.01); *G10L 25/48* (2013.01); *G10L 25/87* (2013.01)

(56) References Cited

U.S. PATENT DOCUMENTS

| | | | |
|---|---|---|---|
| 9,262,520 B2* | 2/2016 | Sweeney ........... | G06F 17/30365 |
| 2008/0221892 A1* | 9/2008 | Nathan et al. ................ | 704/257 |
| 2009/0077025 A1 | 3/2009 | Brooks et al. | |
| 2010/0030552 A1 | 2/2010 | Chen et al. | |
| 2010/0228693 A1* | 9/2010 | Dawson .............. | G06F 17/2705 |
| | | | 707/728 |
| 2011/0196670 A1 | 8/2011 | Dang et al. | |
| 2014/0063555 A1* | 3/2014 | Park et al. ................... | 358/1.18 |

OTHER PUBLICATIONS

"Tag Cloud Guide," http://www-958.ibm.com/software/data/cognos/manyeyes/page/Tag_Cloud.html, pp. 1-2, 2012.
"Wordle," http://www.wordle.net, p. 1, 2012.
Cui et al., "Context Preserving Dynamic Word Cloud Visualization," IEEE Pacific Visualisation Symposium 2010, Mar. 2-5, 2010, Taipei, Taiwan, pp. 1-8.
Fujimura et al., "Topigraphy: visualization for Large-Scale Tag Clouds," WWW2008, Apr. 21-25, 2008, Beijing, China, pp. 1-2.
"WordHoard," http://wordhoard.northwestern.edu/userman/analysis-collocates.html, pp. 1-13, Mar. 1, 2011.
Zubiaga et al., "Content-Based Clustering for Tag Cloud Visualization," http://www.zubiaga.org/publications/files/asonam2009-tag-clustering.pdf, Social Network Analysis and Mining, 2009, pp. 316-319, Jul. 20-22, 2009.
Christopher M. Collins, "Interactive Visualizations of Natural Language," PhD Thesis, pp. 1-324, 2010, see p. 32.
Kaser et al., "Tag-Cloud Drawing: Algorithms for Cloud Visualization," WWW2007, Banff, Canada, pp. 1-10, May 8-12, 2007.
Gambette et al., "Visualising a Text with a Tree Cloud," http://www.lirmm.fr/~gambette/2009GambetteVeronis.pdf, pp. 1-8, 2009.
Hahmann et al., "Maple—A Web Map Service for Verbal Visualisation Using Tag Clouds Generated from Map Feature Frequencies," http://141.30.75.5/aigaion/attachments/Hahmann_Burghardt_Maple.pdf-51935224b7c6a1e917f2d9dd38586fb2.pdf, pp. 1-11, 2011.
Ham et al., "Mapping Text with Phrase Nets", IEEE Trans. on Visualization and Computer Graphics, vol. 15, No. 6, pp. 1169-1176, Oct. 5, 2009.
Simons et al., "FCJ-083 Tag-elese or The Language of Tags," pp. 1-14, Dec. 8, 2008.
"Tag Cloud," http://en.wikipedia.org/wiki/Tag_cloud, pp. 1-6, 2012.
Office Action for U.S. Appl. No. 14/150,553 dated Aug. 19, 2015, pp. 1-28.
Office Action for U.S. Appl. No. 14/150,553 dated Feb. 4, 2016, pp. 1-41.
Office Action for U.S. Appl. No. 14/150,553 dated Jun. 28, 2017, pp. 1-27.

* cited by examiner

PRESENTING TAGS OF A TAG CLOUD IN A MORE UNDERSTANDABLE AND VISUALLY APPEALING MANNER

TECHNICAL FIELD

The present invention relates generally to tag clouds, and more particularly to presenting tags of a tag cloud in a more understandable and visually appealing manner.

BACKGROUND

Tag clouds are visual depictions that allow users to easily see the content of an object or tag source, such as a webpage, news article or video. A tag cloud contains a set of related tags, where each tag is a keyword pertaining to the object or tag source. The tag cloud emphasizes the tags that are more popular or are associated with more frequently used keywords pertaining to the object or tag source, such as by increasing the tag's font size, font color, etc. The tags in the tag cloud may be hyperlinked to keywords within the source for the user's convenience.

Currently, the tags of the tag cloud are presented in a predefined manner, such as in alphabetical order, in order of frequency, in acrostic, in a random order, etc. However, the presentation of such tags in the tag cloud in such a manner may not aid the user in understanding the significance of the tags (i.e., why some tags have a larger font size than other tags) or the interrelation between these tags. Furthermore, the presentation of such tags in the tag cloud in such a manner may be not be visually appealing thereby adding further confusion.

As a result, the tags of a tag cloud are not currently presented in a manner that is visually appealing and that aids in the user's understanding of the tags in order to extract insight from the tag cloud.

BRIEF SUMMARY

In one embodiment of the present invention, a method for presenting tags of a tag cloud in a more understandable and visually appealing manner comprises retrieving tags of a tag cloud associated with an object. The method further comprises assigning the retrieved tags to parts of speech. The method additionally comprises generating, by a processor, combinations of the tags based on the parts of speech assigned to the tags. Additionally, the method comprises determining a layout to display the generated combinations of tags. In addition, the method comprises presenting the generated combinations of tags of the tag cloud using the determined layout.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for presenting tags of a tag cloud in a more understandable and visually appealing manner. In one embodiment of the present invention, tags of a tag cloud that are associated with an object (e.g., web page, a video) are retrieved. The retrieved tags are then assigned to parts of speech (e.g., verb, noun, pronoun, adjective, adverb, preposition, conjunction, interjection). Combinations of the tags are then generated based on the parts of speech assigned to the tags. For example, the combinations of the tags may be based on a template, such as <NOUN> <VERB> <ADJECTIVE>, <PRONOUN> <VERB> <ADJECTIVE>, <PRONOUN> is <ADVERB><VERB> and so forth. A layout to display the generated combinations of tags is then determined. Upon determining the layout to display the generated combinations of tags, the combinations of tags are then presented using the determined layout. Since the tags of the tag cloud are presented in a combination based on the parts of speech assigned to the tags, the tag cloud is more understandable and visually appealing thereby enabling the user to extract insight from the tag cloud.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
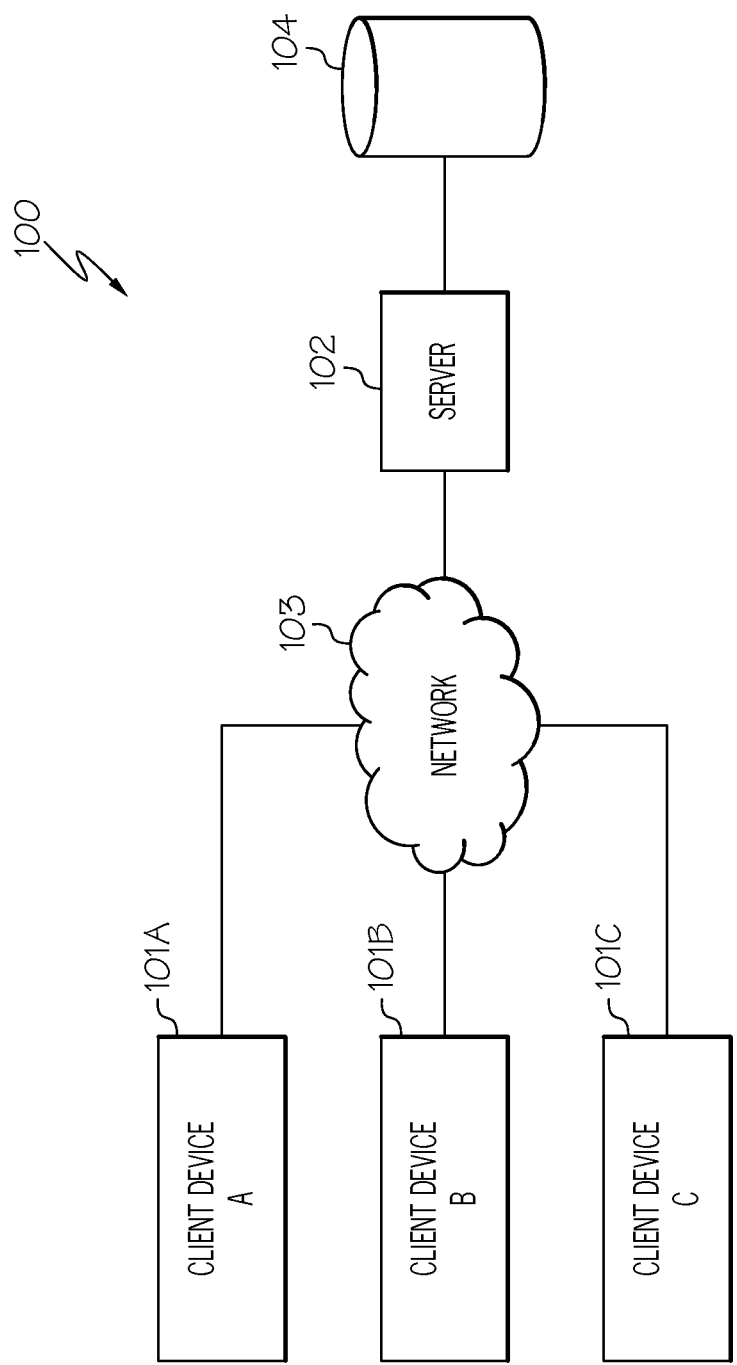
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102.

In one embodiment, server 102 may be a web server configured to host websites. In one embodiment, server 102 is configured to receive a request from client device 101 to load a web page which is then transmitted to the requesting client device 101. In one embodiment, the requested web page may contain one or more tag clouds. Tag clouds are visual depictions that allow users to easily see the content of an object or tag source, such as the website itself or objects on the website, such as an article, video, etc. A tag cloud contains a set of related tags, where each tag is a keyword pertaining to the object or tag source. The tag cloud emphasizes the tags that are more popular or are associated with more frequently used keywords pertaining to the object or tag source, such as by increasing the tag's font size, font color, etc. The tags in the tag cloud may be hyperlinked to keywords within the tag source for the user's convenience. Such tags may be stored in a repository 104 connected to server 102. Repository 104 may also store a library of terms, where each of the terms is associated with one or more parts of speech. A description of the hardware configuration of server 102 is provided further below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C, a single server 102, a single network 103 and a single repository 104, network system 100 may include any number of clients 101, servers 102, networks 103 and repositories 104. The embodiments of network system 100 are not to be limited in scope to the depiction of FIG. 1.

Figure 2:
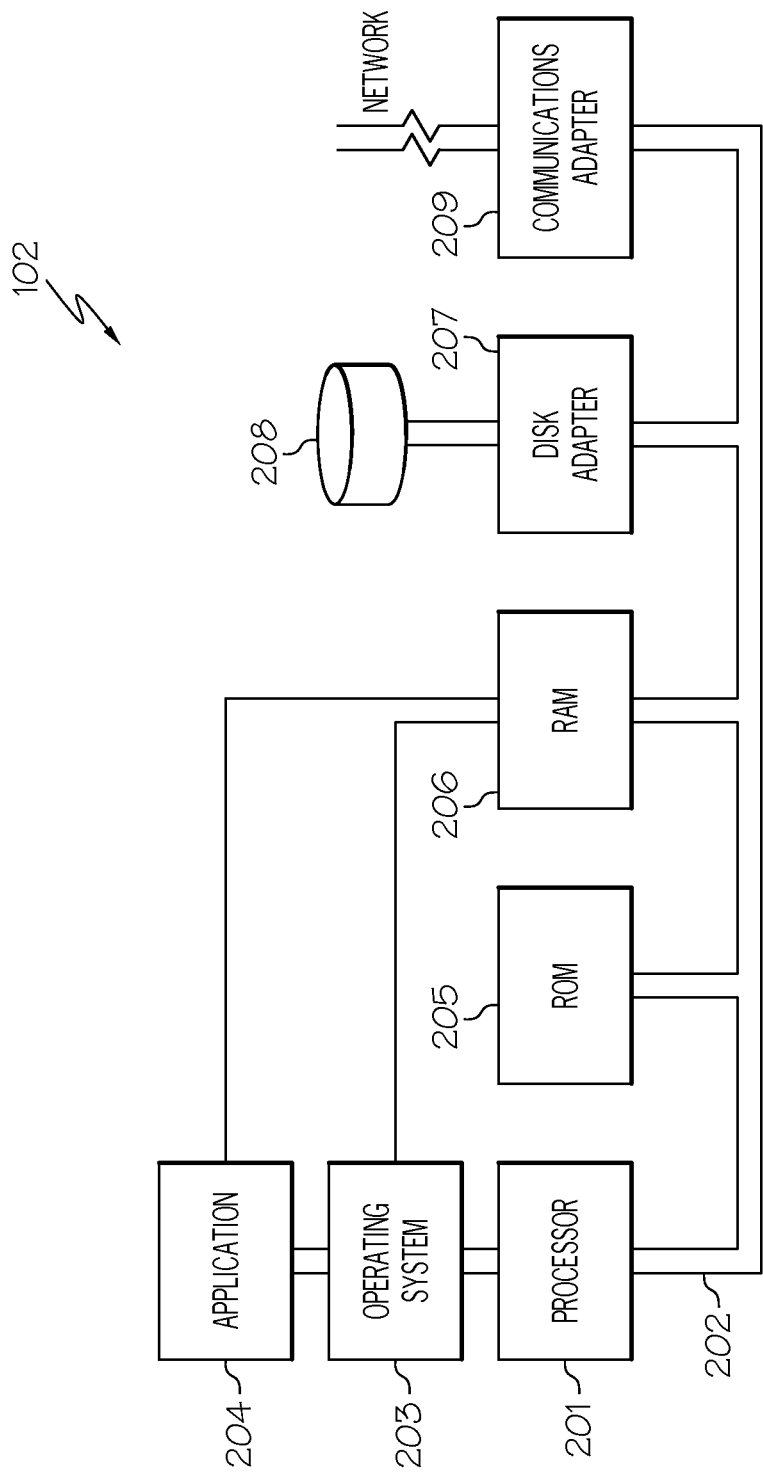
FIG. 2 illustrates a hardware configuration of the server configured in accordance with an embodiment of the present invention.

Referring now to FIG. 2, FIG. 2 illustrates a hardware configuration of server 102 (FIG. 1) which is representative of a hardware environment for practicing the present invention. Referring to FIG. 2, server 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for presenting tags of a tag cloud in a more understandable and visually appealing manner as discussed further below in association with FIG. 3.

Referring again to FIG. 2, read-only memory ("ROM") 205 is coupled to system bus 202 and includes a basic input/output system ("BIOS") that controls certain basic functions of server 102. Random access memory ("RAM") 206 and disk adapter 207 are also coupled to system bus 202. It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. It is noted that the program for presenting tags of a tag cloud in a more understandable and visually appealing manner, as discussed further below in association with FIG. 3, may reside in disk unit 208 or in application 204.

Server 102 may further include a communications adapter 209 coupled to bus 202. Communications adapter 209 interconnects bus 202 with an outside network (e.g., network 103 of FIG. 1) thereby allowing server 102 to communicate with client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As stated in the Background section, currently, the tags of the tag cloud are presented in a predefined manner, such as in alphabetical order, in order of frequency, in acrostic, in a random order, etc. However, the presentation of such tags in the tag cloud in such a manner may not aid the user in understanding the significance of the tags (i.e., why some tags have a larger font size than other tags) or the interrelation between these tags. Furthermore, the presentation of such tags in the tag cloud in such a manner may be not be visually appealing thereby adding further confusion. As a result, the tags of a tag cloud are not currently presented in a manner that is visually appealing and that aids in the user's understanding of the tags in order to extract insight from the tag cloud.

The principles of the present invention provide a means for presenting tags of a tag cloud in a more understandable and visually appealing manner thereby enabling the user to extract insight from the tag cloud as discussed below in association with FIG. 3.

Figure 3:
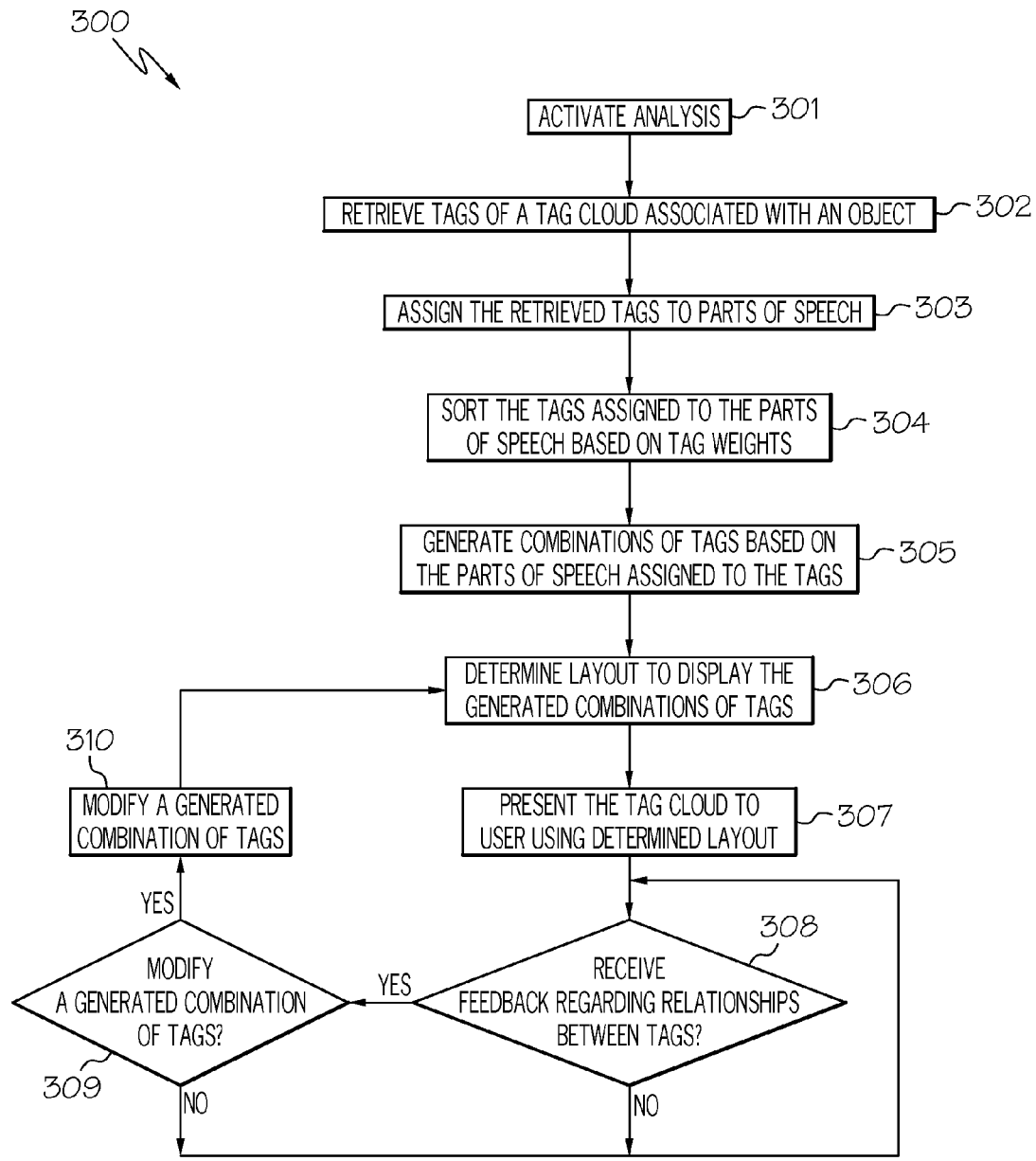
FIG. 3 is a flowchart of a method for presenting tags of a tag cloud in a more understandable and visually appealing manner in order to extract insight from the tag cloud in accordance with an embodiment of the present invention.

FIG. 3 is a flowchart of a method 300 for presenting tags of a tag cloud in a more understandable and visually appealing manner in accordance with an embodiment of the present invention.

Referring to FIG. 3, in conjunction with FIGS. 1-2, in step 301, server 102 activates the analysis on the tags for a tag cloud. In one embodiment, the analysis may be activated upon detecting a request from client device 101 to load a web page containing one or more tag clouds. In another embodiment, the analysis may be activated upon detecting a modification to a tag cloud. In another embodiment, the analysis may be activated upon the occurrence of an event (e.g., Sunday at 2:00 pm) or based upon metrics (e.g., threshold number of webpage views, threshold number of tags).

In step 302, server 102 retrieves the tags of a tag cloud associated with an object (e.g., a webpage, a document, a video, a folder, a multimedia application). For example, server 102 may retrieve the tags of a tag cloud associated with the web page requested by client device 101. For instance, users of client devices 101 may have tagged the website with keywords, such as "enjoyment" and "pure." As a result, such tags ("enjoyment" and pure") may be stored in repository 104 and retrieved by server 102. In another example, server 102 retrieves the tags of a tag cloud associated with a video to be displayed on the web page requested by client device 101. In one embodiment, the tags are retrieved from repository 104, such as via a web service or a Structured Query Language (SQL) query.

In step 303, server 102 assigns the retrieved tags to parts of speech, where the parts of speech may include a verb, a noun, a pronoun, an adjective, an adverb, a preposition, a conjunction and an interjection. For example, the term "smart" may be designated as an adjective; whereas, the term "smartly" may be designated as an adverb. In one embodiment, the parts of speech may be assigned to the terms (i.e., the tags) based on a library of terms, where each of the terms is associated with one or more parts of speech. In one embodiment, such a library of terms is stored in repository 104, where server 102 performs a look-up of the tag in the library of terms.

In step 304, server 102 sorts the tags assigned to the parts of speech based on tag weights. For example, the pronoun of "he/she" may be assigned a higher weight than the term "one" as the term "he/she" may provide more insight of the tag cloud versus the term "one." In another example, action verbs may be weighted higher versus linking verbs or auxiliary verbs. In one embodiment, the weights associated to the tags may be based on the frequency of use of the tag by users of client devices 101 to describe the object.

In step 305, server 102 generates combinations of the tags based on the parts of speech assigned to the tags, including being based on the weight assigned to tags. For example, the tags with the highest weight for its associated parts of speech may be used in a combination prior to tags with a lower weight. Also, within that combination of tags, the tags with the highest weight may be emphasized, such as by increasing that tag's font size, font color, etc. in comparison to the other tags in the combination.

In one embodiment, such combinations are based on a template, such as <NOUN> <VERB> <ADJECTIVE>, <PRONOUN> <VERB> <ADJECTIVE>, <PRONOUN> is <ADVERB><VERB> and so forth. In one embodiment, the number of parts of speech to be utilized in a particular combination of tags as a template is user selected. For example, the user may select three parts of speech (e.g., noun, verb, adjective) or may select four parts of speech (e.g., noun, verb, adjective, adjective) to be used in a combination of tags as a template. In another embodiment, the user may select the number of parts of speech, as well as which parts of speech, are to be utilized in a combination of tags as a template via sliders. In one embodiment, the template may include different combinations of parts of speech.

In one embodiment, server 102 utilizes natural language processing using a natural language library to generate the parts of speech into a cohesive entry (or phrase). That is, natural language processing may be utilized by server 102 to ensure a combination of the tags that is understandable to the users of client devices 101 as well as to provide more insight into the object. In another embodiment, server 102 inserts additional terms in the tag combination, such as "is," or related parts of speech (e.g., he, I, one) to generate the parts of speech into a cohesive entry, i.e., to ensure that the combination of the tags is understandable to the users of client devices 101 as well as to provide more insight into the object.

For example, suppose that a user of client device 101A tags an object as "enjoyment" and "pure." Suppose that a user of client device 101B tags the object as "likeable" and "pager." Suppose further that a user of client device 101C tags the object as "improve" and "pure" and "Roger." In response to a user of client device 101 loading the object, such as a webpage, server 102 retrieves the tags associated with the object. The term "Roger" may be assigned the part of speech of noun. The term "pure" may be assigned the part of speech of adjective. The term "enjoyment" may be assigned the part of speech of noun. The term "improve" may be assigned the part of speech of verb. The term "pager" may be assigned the part of speech of noun. The term "likeable" may be assigned the part of speech of adjective. Since the term "pure" was tagged twice as opposed to the other terms that were tagged once, it may be assigned a higher weight. As discussed above, server 102 may utilize natural language processing using a natural language library to generate the parts of speech into a cohesive entry. Furthermore, server 102 may insert additional terms in the tag combination ("is," "has") or related parts of speech (e.g., "he," "I," "one") to ensure that the combination of the tags is understandable to the users of client devices 101 as well as to provide more insight into the object. As a result, server 102 may generate the combinations of "Roger has pure enjoyment," "Roger improves this pager," "Roger improves the enjoyment," etc. In the example of the combination of "Roger has pure enjoyment," since the term "pure" has a higher weight versus the other terms, the term "pure" may be emphasized by having its font size and/or font color enlarged. By including terms around the emphasized term "pure," the user has a better understanding as to the significance of the term "pure" as well as why it was emphasized thereby providing more insight into the tag cloud. In other words, by including a combination of tags based on the parts of speech assigned to the tags, and emphasizing the tag(s) within that combination based on frequency of use, etc., the tags of the tag cloud are presented in a more understandable and visually appealing manner thereby enabling the user to extract more insight from the tag cloud.

In step 306, server 102 determines a layout to display the generated combinations of tags. For example, a layout of acrostic may be utilized based on the combination of tags. Other examples of arrangements include a sequential, circular, clustered and alphabetical-based arrangement. In connection with determining a layout to display the generated combinations of tags, the tags within a combination of tags that have a higher weight, such as being used more frequently, may be displayed in a manner to highlight the greater weight, such as by increasing the tag's font size, font color, etc. for that combination of tags.

In step 307, server 102 presents the generated combinations of tags of the tag cloud using the layout determined in step 306. Since the tags of the tag cloud are presented in a combination based on the parts of speech assigned to the tags, the tag cloud is more understandable and visually appealing to the users of client devices 101.

In step 308, a determination is made by server 102 as to whether server 102 received any feedback, such as from users of client devices 101, regarding the relationships between the tags. For instance, a user may indicate that the combination of tags is inappropriate.

If there is no feedback regarding the relationships between the tags, then server 102 continues to determine whether it received any feedback in step 308.

If, however, server 102 received feedback regarding the relationships between the tags, then, in step 309, a determination is made by server 102 as to whether a combination of the tags is to be modified. For example, if the feedback from the users of client devices 101 indicates that the combination of "Roger has pure enjoyment" is not accurate, not appropriate, not understandable, not preferable to other combinations of tags in describing the object, etc., then such a combination may be modified, whether in terms of the particular tags used in the combination and/or the manner in which the tag combination is displayed, such as decreasing the font size of particular tags in the tag combination or relocating the location of the tag combination on the web page displayed to the users of client devices 101.

If server 102 is to modify a combination of the tags, then, in step 310, server 102 modifies the generated combination of tags, such as modifying the combination of tags (whether in one or more combinations) and/or the manner in which the combination(s) are displayed. Upon modifying the combination(s) of tags, server 101 determines a layout to display the combinations of tags in step 306.

If, however, server 102 is not to modify a combination of the tags, then server 102 continues to determine whether it received any feedback in step 308.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for presenting tags of a tag cloud in a more understandable and visually appealing manner, the method comprising:
   activating an analysis on tags of said tag cloud in response to detecting a modification by a user to said tag cloud;

retrieving said tags of said tag cloud associated with an object, wherein said object comprises one of the following: a webpage, a document, a video, a folder and a multimedia application, wherein said tags of said tag cloud associated with said object are retrieved from a repository via a structured query language (SQL) query;

assigning parts of speech to said tags, wherein said parts of speech comprises a verb, a noun, a pronoun, an adjective, an adverb, a preposition, a conjunction and an interjection;

generating, by a processor, combination of said tags based on weights assigned to said tags using different linguistic combinations of said parts of speech assigned to said tags, wherein a value of a weight assigned to a tag is based on a type of a part of speech assigned to said tag and frequency of use of said tag to describe said object;

determining a layout to display said generated combinations of tags;

presenting said generated combination of tags of said tag cloud using said determined layout;

modifying a manner in which a combination of said combinations of said tags is displayed in response to feedback regarding relationships between tags of said combination, wherein said feedback comprises at least one of the following: an indication of an inaccurate description, an indication of an inappropriate description and an indication of a not understandable description;

determining a second layout to display said combinations of said tags upon said modification of said combination of said combinations of said tags; and presenting said combinations of said tags of said tag cloud using said determined second layout.

2. The method as recited in claim 1, further comprising:
sorting said tags based on said weights assigned to said tags.

3. The method as recited in claim 1, further comprising:
inserting terms or related parts of speech into a combination of said tags using natural language processing to form a cohesive entry.

4. The method as recited in claim 1, further comprising:
generating said combinations of said tags based on a template of said different linguistic combinations of said parts of speech.

5. The method as recited in claim 4, wherein said template comprises a number of parts of speech that is user selected.

6. The method as recited in claim 5, wherein which parts of speech to be utilized in a combination of tags as said template is user selected via sliders.

7. The method as recited in claim 1, wherein said layout comprises an acrostical arrangement, wherein features of said tags of said generated combinations of said tags of said tag cloud are altered based on said weights assigned to said tags, wherein said features comprise one or more of the following: a font size and a font color.

8. The method as recited in claim 1,
wherein said object comprises said video, wherein the method further comprises:
retrieving said tags of said tag cloud associated with said video to be displayed on a webpage requested by a client device.

9. The method as recited in claim 1, wherein said parts of speech are assigned to said tags based on a library of terms stored in said repository, wherein a server performs a look-up of a tag in said library of terms.

10. The method as recited in claim 1, wherein said layout comprises a sequential arrangement.

11. The method as recited in claim 1, wherein said layout comprises a circular arrangement.

12. The method as recited in claim 1, wherein said layout comprises an alphabetical-based arrangement.

13. The method of claim 1, wherein said manner in which said combination of said combinations of said tags is modified comprises modifying tags used in said combination of said combinations of said tags.

14. The method as recited in 1, wherein said manner in which said combination of said combinations of said tags is modified comprises modifying a font size of particular tags in said combination of said combinations of said tags.

15. The method as recited in claim 1, wherein said manner in which said combination of said combinations of said tags is modified comprises relocating said combination of said combinations of said tags on a webpage displayed to users of client devices.

* * * * *